Aug. 7, 1951      G. KOTZIN      2,563,248
REMOTE CONTROL APPARATUS FOR OPENING AND CLOSING DOORS
Filed June 25, 1948
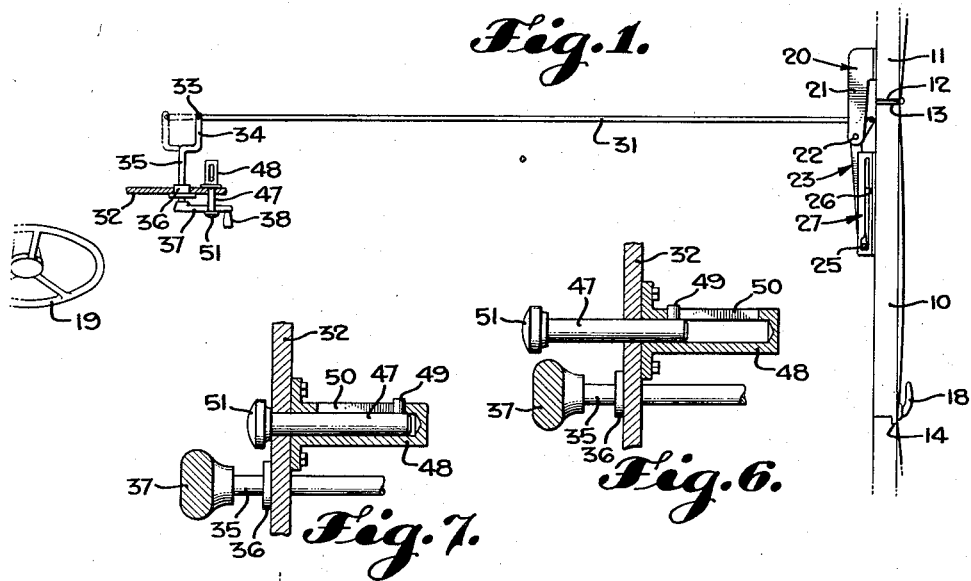
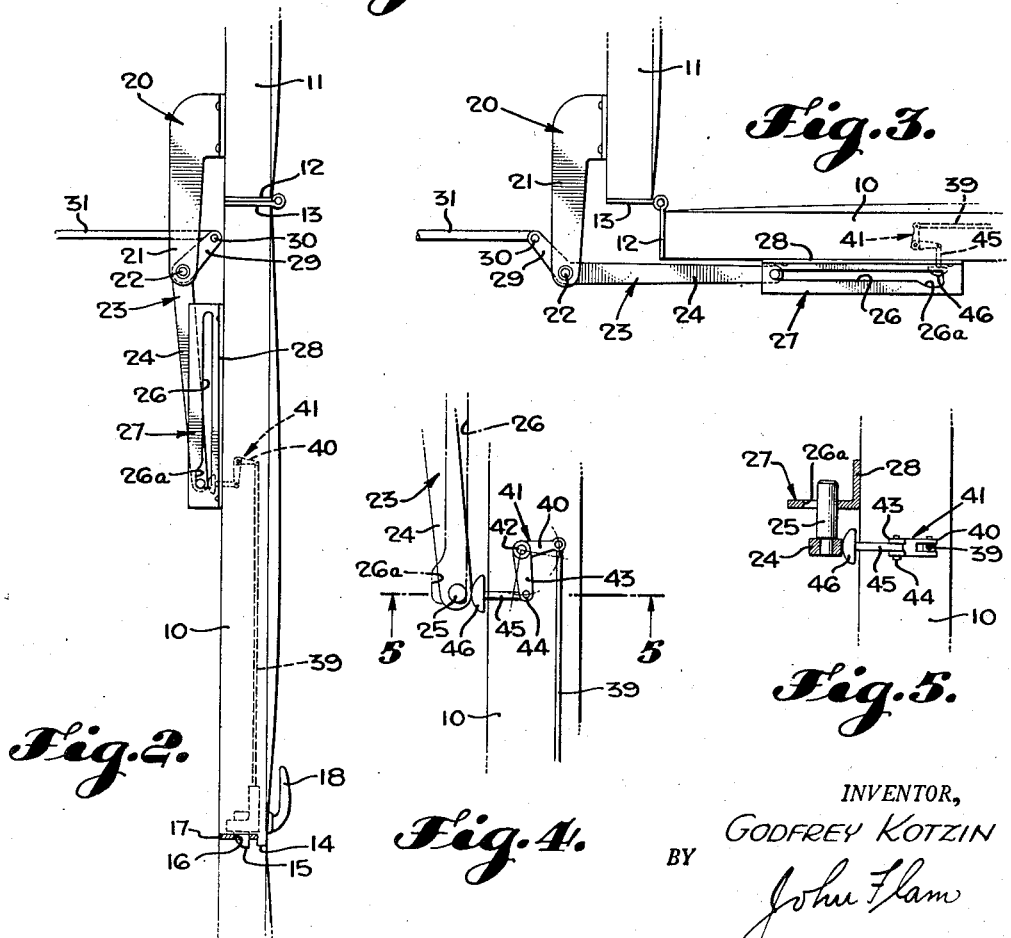
INVENTOR,
GODFREY KOTZIN
BY
John Flam
ATTORNEY Patented Aug. 7, 1951

2,563,248

UNITED STATES PATENT OFFICE 2,563,248

REMOTE CONTROL APPARATUS FOR OPENING AND CLOSING DOORS

Godfrey Kotzin, Los Angeles, Calif.

Application June 25, 1948, Serial No. 35,268

1 Claim. (Cl. 268—71)

The present invention relates to devices for opening and closing doors, and is more particularly concerned with mechanisms for operating automobile doors and the like.

The comparatively wide front seats of many passenger automobiles place the right hand door at a substantial distance from the driver's seat. As a result, the driver can only open and close that door by bodily moving toward it from behind the steering wheel. Even with such shifting of his position, the driver must still reach a considerable distance in swinging the door between open and closed positions.

An object of the invention is to enable the operator of a vehicle to open and close an inconveniently located automobile door with facility from the driver's seat, or from a location substantially removed from the door.

Another object of the invention is to enable the operator of a vehicle to control the locking and unlocking of a vehicle door from a location substantially distant from the door.

A further object of the invention is to provide a single control mechanism for operating a door lock and for moving the door between open and closed positions.

Still another object of the invention is to provide a mechanism operable from a relatively remote location for controlling a door lock or latch and for shifting the door between open and closed positions.

Yet a further object of the invention is to prevent inadvertent movement of a door from a relatively remote location, particularly movement of the door to open position.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claim.

Referring to the drawings:

Figure 1 is a horizontal section through a vehicle, disclosing a door operating and controlling mechanism with the door in closed position;

Fig. 2 is an enlarged horizontal section of the mechanism at the door portion of the vehicle, with the door in closed and locked position;

Fig. 3 is a partial view similar to Fig. 2, with the door open;

Fig. 4 is a partial plan view, on an enlarged scale, of the portion of the mechanism for controlling the bolt of the door lock;

Fig. 5 is a sectional view taken along the line 5—5 on Fig. 4;

Fig. 6 is an enlarged longitudinal section through a stop device forming part of the apparatus; and Fig. 7 is a view similar to Fig. 6 of the stop device in a different position.

The apparatus disclosed in the drawing is used for controlling movement of a door 10, such as an automobile door, between open and closed position. The door is pivotally supported on a stationary vehicle frame 11 in any suitable manner, as by attaching one vertical end of the door to one or more hinge plates 12, which are pivotally connected to companion hinge plates 13 fastened to the frame. The door is swingable to a fully closed position, with its free end 14 engaging the opposite side of the frame defining the door opening. The door may be held in latched position by any suitable form of bolt mechanism, disclosed by way of example in the drawings as a slidable bolt 15 adapted to engage the recess 16 in a strike plate 17 fastened to the stationary frame 11. The bolt may be retracted in a known manner by manipulation of the usual door handle 18.

The door may be located a substantial distance from the operator of the vehicle, who cannot control its opening and closing movements conveniently from the driver's seat behind the steering wheel 19. Without the present device, it becomes necessary for the operator to reach over to the door, in order to open and close it. In doing so, the extent of opening is a matter of chance.

The remote control mechanism for opening and closing the door includes a bracket 20 suitably secured to the car frame 11 adjacent the door hinge 12, 13. The bracket has an arm 21 receiving a pivot pin or fulcrum 22, on which a bell crank lever 23 is oscillatably mounted. One arm 24 of the crank extends along the door 10, and has a pin 25 secured to its free end extending upwardly for reception within a slot 26 in a plate 27 extending across the inner surface of the door. The plate has an upstanding flange 28 secured to the interior of the door in any suitable manner.

The other arm 29 of the bell crank lever is attached by a pin 30 to a connecting rod or link 31, which may extend behind the dashboard 32 of the vehicle toward the steering wheel 19. This rod is connected by a pin 33 to a crankpin 34 integral with and offset from a crankshaft 35 rotatably mounted in a bearing 36 in the dashboard, and extending into the driver's compartment. A crank arm 37 is attached to the compartment end of the shaft 35 and has a crank handle 38 mounted on its free end for facilitating its movement by the operator.

As disclosed in Figs. 1 and 2, the door is in closed position with the pin 25 on the end of the bell crank arm 24 disposed at one end of the slot. In order to open the door, the crank arm 37 is turned upwardly, as seen in Fig. 1, which rotates the crankshaft 35 and crankpin 34 to the left, pulling the connecting link 31 in the same direction and swinging the bell crank lever 23 in a counter-clockwise direction about its pivot pin 22. The door arm 24 of the lever moves in an outward direction, causing its pin 25 to engage the right side of the plate 27 defining the slot 26 and to slide along this slot in shifting the door 10 outwardly to fully open position, such as disclosed in Fig. 3. When the door is in fully open position, the pin 25 is at the other end of the slot 26, to prevent further outward swinging movement of the door.

When the door 10 is in its closed position, the latch bolt 15 engages the recess 16 in the strike plate 17. This bolt is retractable as an incident of moving the crank arm 24 to door opening position. To accomplish this purpose, the bolt is attached to a retracting or releasing rod 39 extending within the door, with its other end attached to one arm 40 of a bell crank lever 41 mounted upon a pin 42 suitably fixed in the door frame. The other arm 43 of the bell crank is connected, by means of a pin 44, to a push rod 45 extending through the door to the interior of the vehicle below the slotted plate 27. This push rod has a head 46 on its free end engageable by the free end of the door operating lever arm 24.

It is to be noted that the outer end 26a of the slot 26 is made wider to allow the lever arm 24 to move inwardly with respect to the door 10 and plate 27 after the door has been closed. Such inward movement of the lever arm allows the push rod 45 to occupy an inner position free from restraint by the arm and permits the bolt 15 of the door lock mechanism to operate in its normal manner and engage the strike plate 17, to hold the door in closed position. When the door is to be opened, the initial movement of the crank arm 37 and of the bell crank lever 23 in a counter-clockwise direction, causes the free end of the lever arm 24 to engage the head 46 and push the rod 45 inwardly, which movement rocks the bell crank 41 in a counter-clockwise direction, as seen in Figs. 2, 3 and 4, to exert a pulling action on the releasing rod 39 and retract the bolt 15 from the strike plate 17. Thereafter, continued movement of the crank arm 37 upwardly, as seen in Fig. 1, causes the door operating arm 24 to swing the door 10 outwardly to open position, in the manner described above.

As the door opens, the free end of the arm 24 rides off the head 46 of the push rod, and allows the bolt 15 to return to its original position. When the door is to be closed, the crank arm 37 is moved in the reverse direction. During such closing movement, the pin 25 on the lever arm engages the other, or left, side of the slot 26, and, upon entering the enlarged slot portion 26a, after the door has been fully closed, the arm 24 moves away from the push rod head 46 and allows the bolt 15 to enter the recess 16 in the strike plate.

The arrangement of parts disclosed in the drawings allows the door to be opened only upon upward movement of the crank arm 37. To prevent inadvertent unlocking of the door and its swinging to open position, a stop pin 47 is mounted on the dash 32 immediately above the crank arm. This stop pin is telescoped within a socket 48 secured to the inside of the dash, the pin having a key or pin 49 engageable in a slot 50 in the socket. When the knob 51 of the pin is grasped and the pin 47 pulled outwardly, it is disposed in the path of travel in the crank arm 37 and will not permit the latter to be moved to door opening position. Such outward movement of the stop pin is limited by engagement of its pin 49 with the end of the slot 50. When the door is to be purposely opened, the pin 47 is pushed inwardly to the extent limited by engagement of its inner end with the base of the socket 48, removing the stop from the path of travel of the crank arm 37, and allowing the latter to be manipulated.

The inventor claims:

A swingable door; a latch carried by the door; a mechanism carried by the door for releasing the latch and including a projection carried by the door, which projection when pushed in a door-opening direction causes the latch to be released; a pivoted lever mounted adjacent the door, one arm of the lever having an end in alignment with the projection when the door is closed and urging said projection when operated to release said latch; means for operating said lever; a slotted bracket carried by the door, the slot extending to a position adjacent the projection; and a pin carried by the said arm and accommodated in said slot, said pin operating on the sides of the slot to swing the door; and the slot at that place adjacent the projection having substantial clearance with respect to the pin to permit the lever to be moved by the projection upon closing the door for maintaining the latch in engaging position.

GODFREY KOTZIN.

REFERENCES CITED

The following references are of record in the file of this patent:

UNITED STATES PATENTS

| Number | Name | Date |
|---|---|---|
| 1,214,488 | Bosler | Jan. 30, 1917 |
| 1,704,476 | Hennicke | Mar. 5, 1929 |
| 1,969,767 | Steele | Aug. 14, 1934 |